No. 769,224. PATENTED SEPT. 6, 1904.
J. S. LUCOCK.
GLASS ETCHING MACHINE.
APPLICATION FILED SEPT. 15, 1903.
NO MODEL. 5 SHEETS—SHEET 1.

Witnesses:
Geo. B Rowley
J. R. Keller

Inventor:
John S. Lucock
By Kay Totten Winter
Attorneys.

No. 769,224. PATENTED SEPT. 6, 1904.
J. S. LUCOCK.
GLASS ETCHING MACHINE.
APPLICATION FILED SEPT. 15, 1903.
NO MODEL. 5 SHEETS—SHEET 3.

Witnesses:
Geo. B Rowley
J. R. Keller

Inventor:
John S. Lucock
By Kay Totten twister
Attorneys.

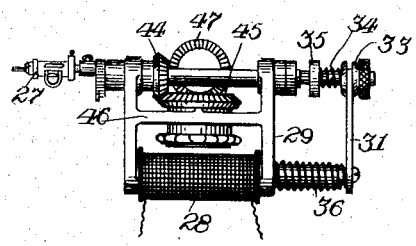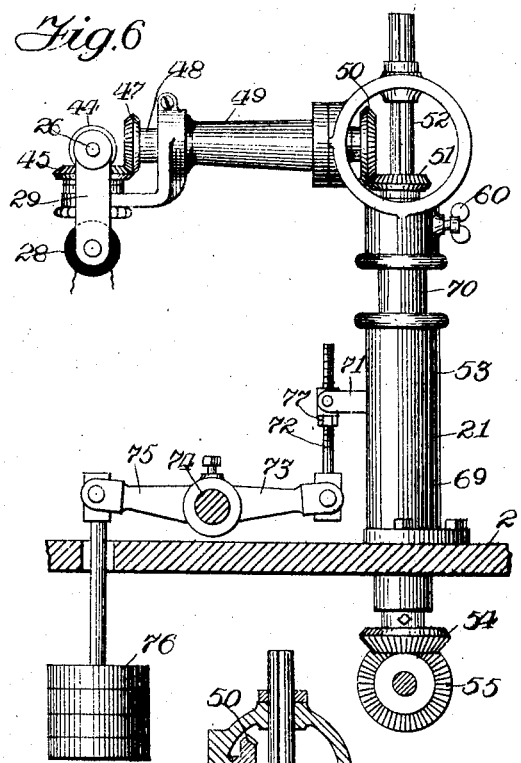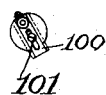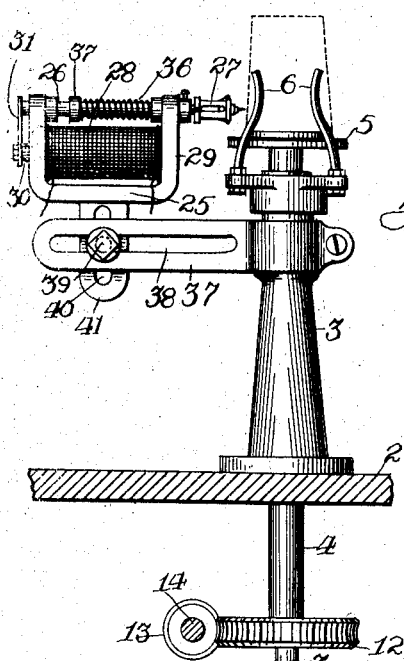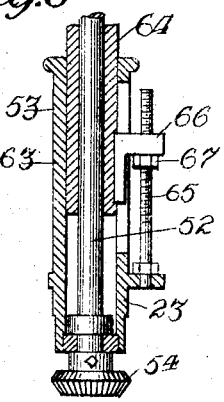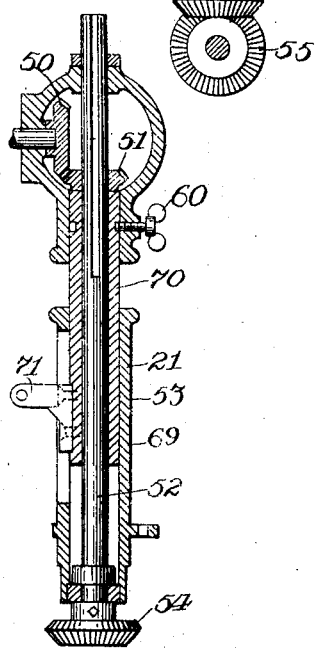

No. 769,224. PATENTED SEPT. 6, 1904.
J. S. LUCOCK.
GLASS ETCHING MACHINE.
APPLICATION FILED SEPT. 15, 1903.
NO MODEL. 5 SHEETS—SHEET 5.

Witnesses:
Geo. B. Rowley.
J. R. Keller

Inventor:
John S. Lucock
By Kay Totten Hunter
Attorneys.

No. 769,224.

Patented September 6, 1904.

UNITED STATES PATENT OFFICE.

JOHN S. LUCOCK, OF BELLEVUE, PENNSYLVANIA, ASSIGNOR TO SOMMERFELD MACHINE AND MANUFACTURING CO., OF PITTSBURG, PENNSYLVANIA, A CORPORATION OF PENNSYLVANIA.

GLASS-ETCHING MACHINE.

SPECIFICATION forming part of Letters Patent No. 769,224, dated September 6, 1904.

Application filed September 15, 1903. Serial No. 173,342. (No model.)

*To all whom it may concern:*

Be it known that I, JOHN S. LUCOCK, a resident of Bellevue, in the county of Allegheny and State of Pennsylvania, have invented a new and useful Improvement in Glass-Etching Machines; and I do hereby declare the following to be a full, clear, and exact description thereof.

My invention relates to engraving and similar machines, and has been designed especially for forming designs on paraffin-coated glass and similar articles preparatory to etching the same.

The object of my invention is to provide a machine of this type whose operation is practically automatic and which runs continuously, so that the work is done more expeditiously than has heretofore been the case.

Figure 1:
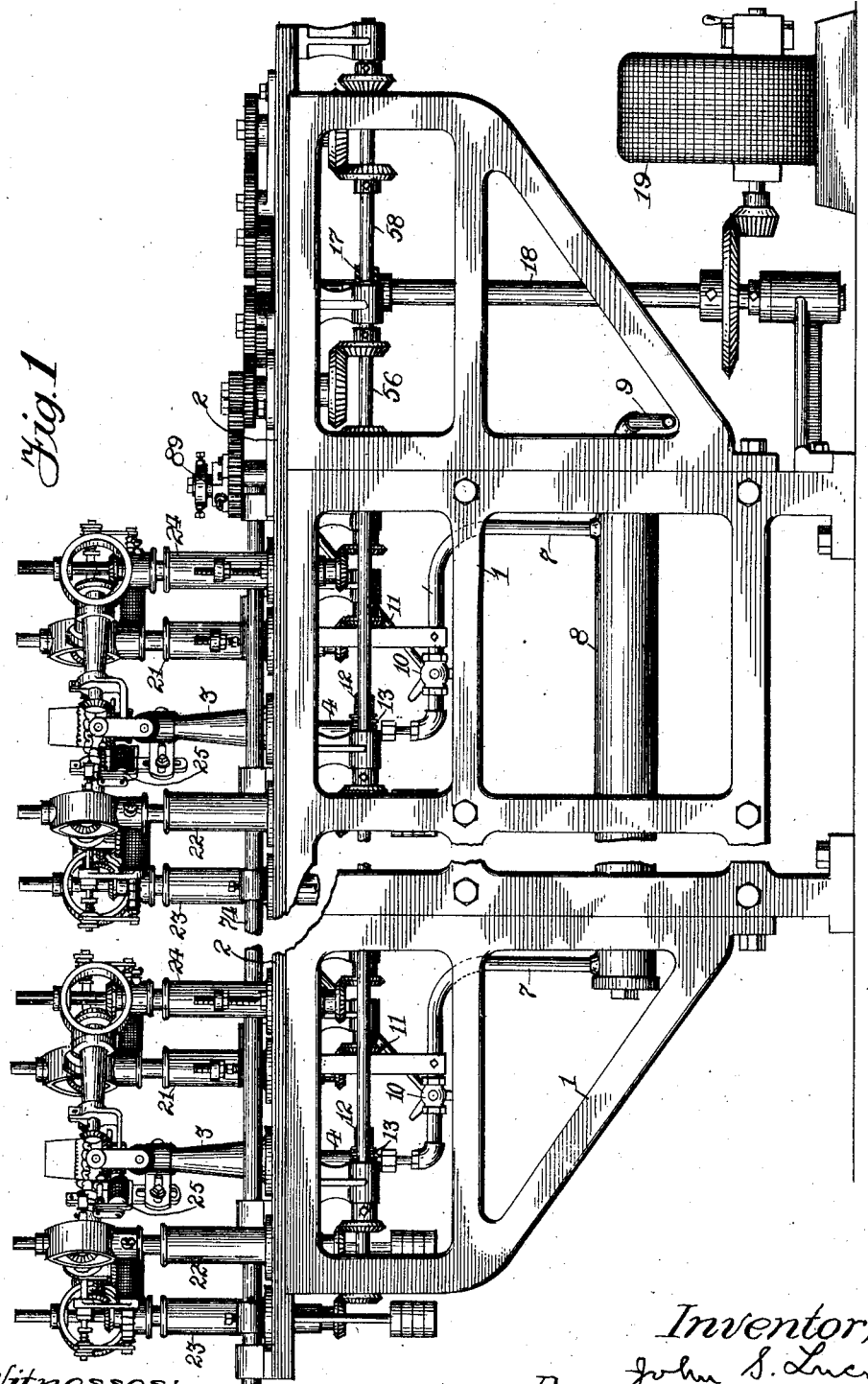
Figure 2:
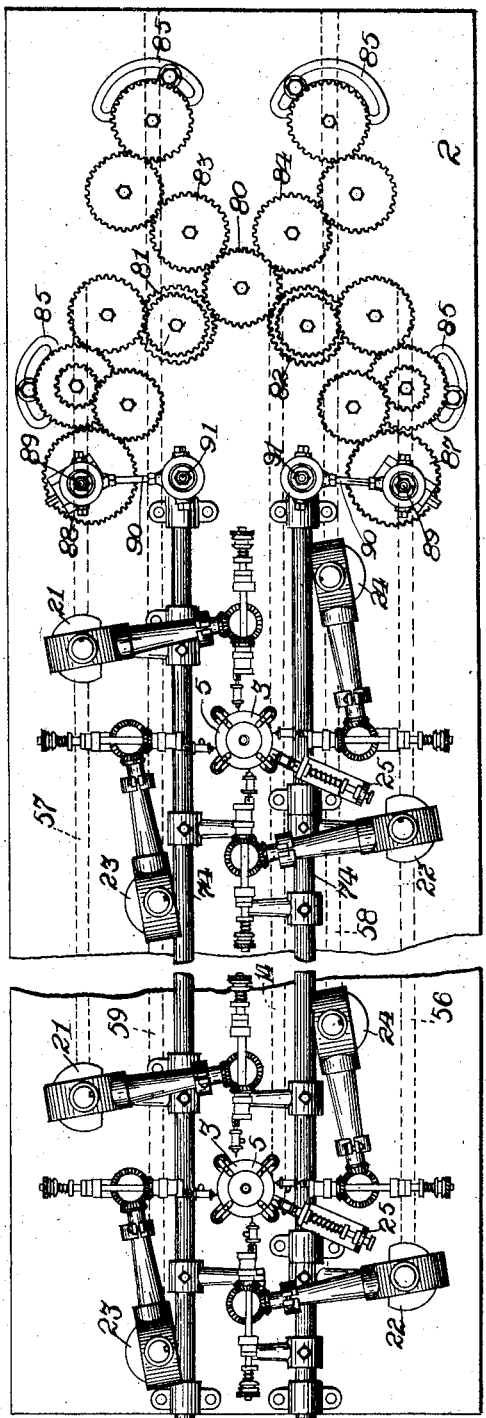
Figure 3:
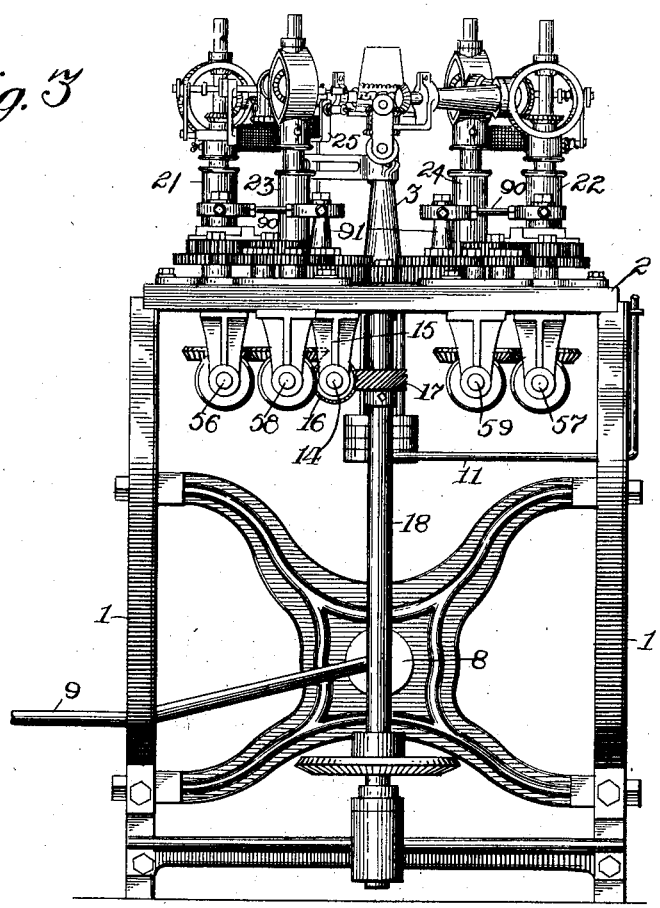
Figure 4:
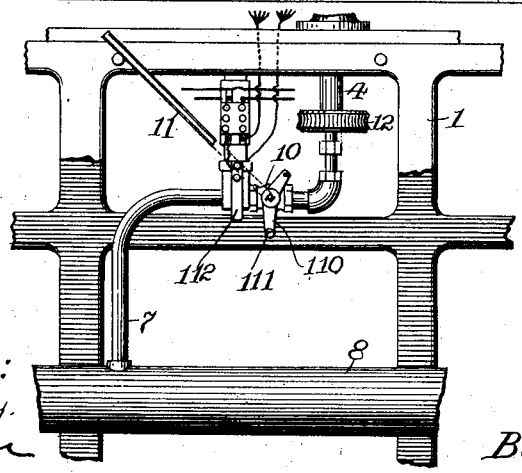
Figure 5:
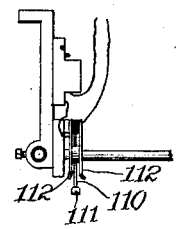
Figure 17:
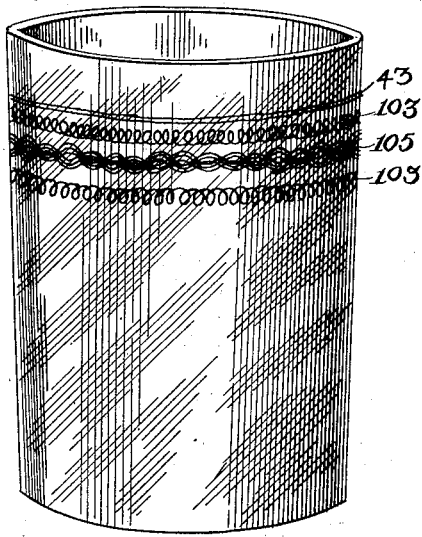
Figure 18:
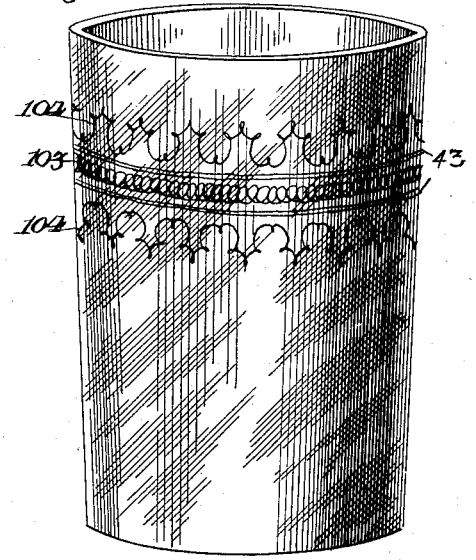
Figure 12:
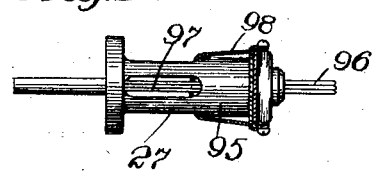
Figure 14:
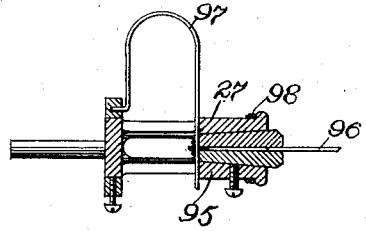
Figure 13:
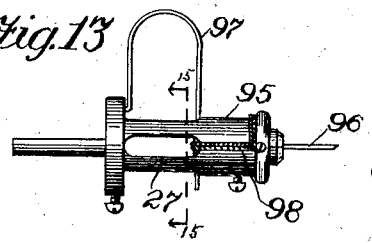
Figure 15:
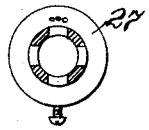
Figure 16:
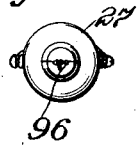

In the accompanying drawings, Figure 1 is a side view of my machine. Fig. 2 is a plan view of the same. Fig. 3 is an end view of the same. Fig. 4 is a detail side view showing the means for operating the work-holder and moving the tool-holder. Fig. 5 is a detail end view thereof. Fig. 6 is a side elevation of a vertically-reciprocating tool-head. Fig. 7 is a vertical section through the standard thereof. Fig. 8 is a similar view through the lower portion of a standard of a normally immovable tool-head. Fig. 9 is a side elevation of one of the tool-holders. Fig. 10 is a front view of the tool. Fig. 11 is a side elevation of the work-holder and its attached tool-holder. Fig. 12 is a plan view of one form of tool. Fig. 13 is a side view thereof. Fig. 14 is a longitudinal section thereof. Fig. 15 is a transverse section thereof on line 15 15, Fig. 13, the spring being omitted. Fig. 16 is a front view thereof, and Figs. 17 and 18 show tumblers having thereon designs which may be produced by my machine.

The machine shown in the drawings is designed especially for cutting or scratching designs in the paraffin-coating of glass tumblers and the like preparatory to etching the same, although the invention is not limited to this use, but may be used for various engraving or marking purposes.

The machine comprises a plurality of work-holders and a group of tool heads and holders for each work-holder. In the drawings only two groups of such tools and work-holders are shown; but it will be understood that any number thereof may be employed by merely extending the length of the machine. As all of these groups of work-holders and tool-heads are similar, a description of one set will suffice for a description of all.

The machine is provided with a suitable frame 1, having thereon a table 2, on which the operative parts are mounted. The work-holder comprises a suitable hollow standard 3, secured to the table and having passing up through the same a rotatable shaft 4, having on its upper end the disk 5, which constitutes the work-holder. Suitable guide-fingers 6 are provided, so that the work, such as a tumbler, can be quickly placed in position. The work is set on this disk 5 and is held thereon preferably by the suction of a vacuum, and as a consequence the shaft 4 is made hollow and is connected by means of a pipe 7 to a vacuum-chamber 8. The latter is connected, by means of a pipe 9, to a suitable exhaust-pump. (Not shown.) In the pipe 7 is a controlling valve or cock 10, having secured thereto a lever 11 for opening and closing the same. The shaft 4 of the work-holder is rotated by means of a worm-wheel 12, fast thereon and which is engaged by a worm 13 on a horizontal shaft 14, mounted in suitable hangers 15, secured to the lower side of the table 2. The shaft 14 at one end is provided with a worm-wheel 16, which meshes with a worm 17 on the vertical power-shaft 18, the latter being driven from any suitable source of power, such as the electric motor 19.

Arranged around the work-holder are a group of tool-holding heads, the number and character of which may be varied according to the particular work to be performed. As shown in the drawings, there are five such tool-heads shown, comprising two rotary and vertically-movable heads 21 and 22, two rotary but non-vertically-movable heads 23 and 24, and one stationary head 25. The heads 21 to 24 are preferably mounted on standards rising from the table, whereas the stationary head 25 is mounted on the workholding standard 3. Each of the tool-heads comprises a suitable tool-holding spindle 26, carrying on its end the tool 27, together with means for moving said spindle toward and from the work. This means preferably is an electromagnet, which is shown as a solenoid 28, mounted in the lower part of a yoke 29, in the upper part of which the tool-spindle 26 is slidably mounted. The core 30 of the solenoid is connected, by means of an arm 31, to the outer end of the tool-spindle, so that when said solenoid is energized and the core drawn into the coil said tool-spindle will be moved toward the work. The arm 31 may either contact directly with the end of the spindle, as shown in Fig. 11, or may be connected to a collar 33, slidably mounted on said tool-spindle and having a spiral spring 34, placed between the same, and a collar 35, fixed to said spindle, as shown in Fig. 9, so that the magnet will press the spindle yieldingly against the work.
A suitable spring is employed for retracting the tool-holding spindle when the solenoid is deënergized. This spring 36 may either surround the core of the magnet and be interposed between the yoke 29 and the arm 31, as shown in Fig. 9, or else may surround the tool-holding spindle 26, as shown in Fig. 11, being interposed between a collar 37 on said spindle and the yoke 29.

The stationary tool-head 25 is mounted on an arm 37, secured to the work-holder 3, and in order that it may be adjusted relatively to the work said arm is provided with a slot 38, through which passes a bolt 39, said bolt passing through a vertical slot 40 on the depending arm 41, secured to the yoke 29. By this means this tool-holder may be adjusted both vertically and horizontally. The tool held in this holder has no movement except toward and from the work, and as a consequence the tool therein will merely form straight lines around the rotating article, such straight lines being shown at 43 in Figs. 17 and 18. The remaining tool-holders are adapted to be rotated, and as a consequence the tool-spindles thereof are rotatably mounted in bearings in the yokes 29, each of said spindles being provided with a bevel-pinion 44, meshing with a similar pinion 45, mounted on a short shaft mounted in a cross-bar 46 in the yoke 29.
The latter is engaged by a pinion 47 on the outer end of a shaft 48, which is mounted in a hollow arm 49, secured to the standard of the tool-heads and in turn having the yoke 29 secured to the outer end thereof. On the inner end of the shaft 48 is a bevel-pinion 50, which meshes with a similar pinion 51, splined to and slidable on a vertical shaft 52, passing down through the hollow standard 53 of the toolhead and having on its lower end a pinion 54, which meshes with a similar pinion 55 on a horizontal shaft. A separate horizontal shaft is provided for each of the tool-heads 21, 22, 23, and 24, said shafts being designated at 56, 57, 58, and 59, respectively, and being mounted in suitable hangers secured to the lower side of the table 2 and extending longitudinally of the machine. By means of the gearing shown each of the tool-holders in the heads 21, 22, 23, and 24 can be rotated, and the arms 49 are so mounted on the standard that they can be swung angularly with relation thereto, so that they can be entirely thrown out of operation, if necessary. They are held in position by means of suitable thumb-screws 60.

The tool-heads 23 and 24 are vertically adjustable, so that the design can be placed at different heights of the article, this adjustment being secured by making their standards 53 in two sections, a lower section 63 and an upper section 64, and securing to one of said sections a threaded rod 65, passing through a perforated ear 66 on the other section and having on said rod below said ear the adjusting-nut 67. The remaining two tool-heads—namely, 21 and 22—are so mounted that they can be moved up and down during the operation of the machine. To this end the standards of said heads are also formed in two sections, a lower stationary section 69, which is preferably formed tubular, and an upper movable section 70, mounted in said lower section. Said upper section is provided with a projecting ear 71, which is connected, by means of a rod 72, to an arm 73 on a rockshaft 74, suitably mounted on top of the table 2, and which shaft is rocked by means of mechanism hereinafter described. Two such rock-shafts are shown, one on each side of the table, and said shafts are provided with an arm or arms 75, having connected thereto the counterweights 76, which act to normally hold the heads elevated. The vertical position of these heads may also be varied by suitable adjusting means, as by making the connecting-rod 72 threaded, as shown, and providing suitable adjusting-nuts 77 thereon.

The longitudinal shafts 56, 57, 58, and 59, as well as the rock-shafts 74, extend longitudinally of the machine and are driven by mechanism at one end thereof. The vertical power-shaft 18 extends up through the table and is provided at its upper end with a spurgear 80, and driven from said spur-gear are four trains of gearing 81, 82, 83, and 84, each train of which leads to and drives one of the shafts 56, 57, 58, and 59. As various forms of gearing may be used in these trains, detailed illustration and description are not made.
Each of these trains, however, has one of the gears mounted on a suitable segment 85, whereby change-gears can be applied in order to vary the relative speed of the different tool-holders or whereby any one or more of said trains can be entirely disconnected to throw its respective tool out of operation. The trains 81 and 82 also drive spur-gears 87 and 88, each of which is provided with a crank 89, connected, by means of the rod 90, to an arm 91 on the end of each of the rock-shafts 74, thus imparting a vertical movement to the tool-holders in the heads 21 and 22. The crank-pins 89 on the gears 88 are radially adjustable on said gears in order to vary the extent of the vertical movement of these tools.

The tools are all of the same general character, although they differ slightly, according to the character of the work they are to do. Each tool comprises a body 95, having mounted therein one or more cutting-points 96, which are normally pressed outwardly by means of a bow spring or springs 97, extending through eyes formed in the inner end of the cutters. An elastic band 98 may be used to reinforce these springs, if necessary. With a non-rotating tool, such as shown in the head 25, the cutting-points 96 are placed practically centrally of the tool-body, and there will be as many points to this tool as the number of straight lines which are desired to be formed in the design. For instance, in the design shown in Fig. 17 two straight lines are found, and consequently the tool in the head 25 will be provided with two points, while in the design shown in Fig. 18 four such points will be placed in said tool and spaced apart the distances between the straight lines shown in said design. In the rotating tool-heads the tools are all of substantially the same construction as shown, the only difference being that the cutting point or points 96 are mounted in a slide 100, which can be adjusted radially of the tool-body 95, as by means of the slot-and-screw connection 101. (Shown in Fig. 10.) The rotating tools are intended to produce scrolls or the like in the design, and the size of these scrolls can be varied by adjusting the cutting-points nearer to or farther away from the axis of the tool-holder. The rotating tools carried by the heads 23 and 24, which do not reciprocate vertically, will form simple scrolls, such as shown at 103 in Figs. 17 and 18, whereas the rotating tools in the vertically-reciprocating heads 21 and 22 will form the scallops shown at 104 on Fig. 18, the loops being produced by the rotation of the tool and the curved portions connecting said loops being formed both by the rotation of the tool and the vertical movement of the tool-head. The design shown at 105 in Fig. 17 is formed by non-rotary tools each provided with three points and held in the vertically-movable heads 21 and 22, this being accomplished by throwing the driving-gear for the shafts 56 and 57 out of operation, but permitting the rock-shafts 74 for said heads to remain in operation. Thus a variety of different designs may be formed by this machine by varying the character and movement of the several tools.

In order to permit the machine to run continuously and facilitate the placing of the work on the machine and the bringing the tools into contact therewith, I have arranged the circuit-closer for the magnets 28, so that it will be operated from the same lever 11 which operates the valve 10 of the suction device for holding the work. To accomplish this, I have connected to the plug of the valve 10 an arm 110, carrying at its outer end a metallic disk 111, which is adapted to be brought between the spring-terminals 112, which are placed in the circuit leading to the electromagnets 28. As a consequence the work can be put in place and again removed without stopping the machine. The lever 11 therefore constitutes a hand-controller for both the work-securing means and for the tool-holder, and by means thereof the work-securing means is rendered active and the tool-holders are advanced toward the work, and these movements being secured without stopping the machine or in any manner interfering with the motive power thereof. A single circuit-closer is used for all of the electromagnets of any one group of tool-holders, and the circuit-closing arm 110 is so positioned with reference to the plug of the valve 10 that said valve will be opened slightly in advance of closing the circuit between the terminals 112. As a consequence the work will be gripped by the work-holder slightly in advance of the tools coming in contact therewith. This relieves the operator from the duty of seeing that the work is secured in place before the tools are brought into contact therewith.

The number of work-holders and groups of tools may be increased by merely extending the length of the machine-frame and of the longitudinal shafts 56, 57, 58, 59, and 74, each tool-holder and group of tools being a mere duplication of the other groups and all being driven from a single set of gearing at the end of the machine.

The design to be worked on the article can be varied within wide limits, as above described. The tool-heads having been properly adjusted as to position, character of tool, and speed of driving to give the necessary design, the machine will be started. The operator will then place the work, such as the tumbler shown, on the disk 5, and then by merely moving the lever 11 the work will be secured in position and the tools brought into contact therewith. The operation will then continue until the design has been formed entirely around the article, and even here care on the part of the operator is not necessary, because even if the tool should pass several times around the article the mechanism is so designed that in the second travel around the article the tools will merely retrace their former lines. As soon as completed the operator will move the lever 11 in the opposite direction, take off the finished article, and replace it by another without stopping the machine, then again moving the lever 11 over to grip said article and bring the tools into contact therewith. A single operator is enabled to attend at least two sets of work-holders and tools.

The machine is power driven and runs continually. As the work-holding means can be rendered active and inactive and the tool-holders can be advanced toward the work and retracted by hand-controlled means entirely independent of the driving means for the machine, the work can be taken off and placed on the machine without stopping the latter. As a consequence no appreciable loss occurs in changing the work, and the output of the machine is much larger than with prior machines for doing the same work, which prior machines were hand driven, and it was necessary to stop the machine in order to remove the work and place other work thereon, and it was also necessary to secure the work in place by hand-manipulated means and also to move the tools into contact with the work by hand.

What I claim is—

1. In an engraving-machine, the combination of a work-holder, a tool-holder, suction apparatus arranged to secure the work to the work-holder, means for moving the tool-holder toward the work, hand-operated means, and connections actuated thereby and arranged to bring the suction means into operation slightly before moving the tool-holder.

2. In an engraving-machine, the combination of a work-holder, a tool-holder, means for securing the work to the work-holder, an electromagnet for moving the tool-holder toward the work, hand-operated means, and connections actuated thereby and arranged to operate the work-securing means slightly before energizing the electromagnet.

3. In an engraving-machine, the combination of a work-holder, a tool-holder, a suction device connected to said tool-holder, a valve in said connections, an electromagnet for moving the tool toward the work, a circuit-closer therefor, hand-operated means, and connections between the same and the valve and circuit-closer.

4. In an engraving-machine, the combination of a work-holder, a tool-holder, a suction device connected to said work-holder, a valve in said connection, an electromagnet for moving the tool-holder toward the work, a circuit-closer for said electromagnet, said circuit-closer comprising an arm secured to the valve, and means for actuating said valve.

5. In an engraving-machine, the combination of a rotary work-holder, a rotary tool-holder, power mechanism for driving the same continually, means for securing the work to the work-holder, means for moving the tool-holder toward the work, and hand-controlled means for rendering said work-securing means active and inactive and for bringing said tools into contact with the work, said hand-controlled means being independent of the driving mechanism for the machine.

6. In an engraving-machine, the combination of a rotary work-holder, a rotary tool-holder, power mechanism for driving the same continually, suction apparatus arranged to secure the work to the work-holder, means for moving the tool-holder toward the work, and hand-controlled means for rendering said suction apparatus active and inactive and for bringing said tool into contact with the work, said hand-controlled means being independent of the driving mechanism for the machine.

7. In an engraving-machine, the combination of a rotary work-holder, a rotary tool-holder, power mechanism for driving the same continually, means for securing the work to the work-holder, an electromagnet for moving the tool-holder toward the work, and hand-controlled means for rendering said work-securing means active and inactive and for energizing said electromagnet, said hand-controlled means being independent of the driving mechanism for the machine.

8. In an engraving-machine, the combination of a rotary work-holder, a rotary tool-holder, power mechanism for driving the same continually, suction apparatus arranged to secure the work to the work-holder, an electromagnet for moving the tool-holder toward the work, a valve for controlling said suction apparatus, a circuit-closer for controlling said electromagnet, and hand-controlled means independent of the driving mechanism for said machine and arranged to actuate said valve and said circuit-closer.

9. In an engraving-machine, the combination of a rotary work-support, a group of tool-heads surrounding the same, a tool-holder mounted in each head, power mechanism for rotating said work-support, for rotating one or more of said tool-holders, and for raising and lowering one or more of said tool-holders, means for securing the work to the work-holder, means for moving the tool-holders toward the work, and hand-controlled means for rendering said work-securing means active and inactive and for bringing said tools into contact with the work.

10. In an engraving-machine, the combination with a plurality of rotary work-supports, mechanism for rotating the same, a group of tool-heads surrounding each work-support, tool-holders mounted in said heads, parallel shafts mounted in the machine-frame and extending longitudinally thereof, gearing between one of said shafts and the work-supports, and gearing between others of said shafts and one or more of said tool-holders of each group for rotating the same.

11. In an engraving-machine, the combination with a plurality of rotary work-supports, a group of tool-heads surrounding each work-support, tool-holders mounted in said heads, parallel shafts, connecting gearing between one of said shafts and the work-supports and between others of said shafts and one or more of the tool-holders of each group, and gearing at the end of the machine for rotating said shafts.

12. In an engraving-machine, the combination with a rotary work-support, a group of tool-heads surrounding the same, rotary tool-holders mounted in one or more of said heads, parallel rotating shafts, connecting gearing between the same and said work-holder and said rotary tool-holders, a rock shaft or shafts parallel with said rotary shafts, connections from the same to one or more of said tool-holders for raising and lowering the same, and gearing at the end of the machine for rotating said parallel shafts and rocking said rock-shafts.

In testimony whereof I, the said JOHN S. LUCOCK, have hereunto set my hand.

JOHN S. LUCOCK.

Witnesses:
ROBERT C. TOTTEN,
G. KREMER.